(12) United States Patent
Bramberger et al.

(10) Patent No.: US 11,761,176 B2
(45) Date of Patent: Sep. 19, 2023

(54) METHOD AND DEVICE FOR MAINTAINING AND/OR REPAIRING A CONSTRUCTION MACHINE

(71) Applicant: Liebherr-Werk Biberach GmbH, Biberach an der Riss (DE)

(72) Inventors: Robert Bramberger, Biberach an der Riss (DE); Martin Kögl, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 0 days.

(21) Appl. No.: 17/089,568

(22) Filed: Nov. 4, 2020

(65) Prior Publication Data
US 2021/0054601 A1   Feb. 25, 2021

Related U.S. Application Data

(63) Continuation of application No. PCT/EP2019/061281, filed on May 2, 2019.

(30) Foreign Application Priority Data

May 4, 2018 (DE) .................... 10 2018 110 742.0

(51) Int. Cl.
*B33Y 50/02* (2015.01)
*E02F 9/26* (2006.01)
*B22F 10/25* (2021.01)

(52) U.S. Cl.
CPC .............. *E02F 9/267* (2013.01); *B33Y 50/02* (2014.12); *E02F 9/268* (2013.01); *B22F 10/25* (2021.01)

(58) Field of Classification Search
CPC ....... B29C 64/386; G06Q 10/06; Y02P 90/30; B33Y 50/02; E02F 9/268
See application file for complete search history.

(56) References Cited

U.S. PATENT DOCUMENTS 5,831,854 A * 11/1998 Yamamoto ........... H05K 13/081
  700/95
9,370,792 B2   6/2016 Wesselky et al.
(Continued)

FOREIGN PATENT DOCUMENTS

DE   202012003317 U1   8/2012
DE   202012003332 U1   8/2012
(Continued)

*Primary Examiner* — Alicia M. Choi
(74) *Attorney, Agent, or Firm* — Levine Bagade Han LLP

(57) ABSTRACT

The invention relates to a device for maintaining and/or repairing a construction machine, with a mobile maintenance station that can be placed at the jobsite where the construction machine is being used, comprising a 3D printer for printing replacement parts for the construction machine on the basis of component data and/or a mobile display device for displaying repair information on the construction machine on the basis of component data, wherein a data supply station that is at a separate location from the maintenance station is provided, can be connected to the maintenance station by way of a communication link and is configured for providing the maintenance station with 3D printing data for printing the replacement part, and the maintenance station is configured for printing the replacement part layer by layer on the basis of the 3D printing data received from the data supply station.

20 Claims, 4 Drawing Sheets

(56) References Cited

U.S. PATENT DOCUMENTS

| | | | |
|---|---|---|---|
| 2005/0234602 A1* | 10/2005 | Rigsby | G06Q 10/06 701/1 |
| 2008/0071563 A1* | 3/2008 | Togashi | G06Q 30/016 705/304 |
| 2012/0065944 A1* | 3/2012 | Nielsen | G06Q 10/103 703/1 |
| 2014/0076985 A1 | 3/2014 | Pettersson et al. | |
| 2015/0057784 A1* | 2/2015 | Butler | G06F 3/1288 700/119 |
| 2015/0064299 A1* | 3/2015 | Koreis | B33Y 30/00 425/375 |
| 2015/0134955 A1* | 5/2015 | Lacaze | H04L 9/0877 713/168 |
| 2016/0054726 A1* | 2/2016 | Yoo | G05B 19/4099 |
| 2016/0067927 A1* | 3/2016 | Voris | B29C 64/386 700/98 |
| 2016/0086254 A1 | 3/2016 | Tapley et al. | |
| 2016/0121438 A1* | 5/2016 | Ladewig | B23P 6/002 29/714 |
| 2016/0167307 A1* | 6/2016 | Eramian | B29C 64/386 700/98 |
| 2016/0236414 A1* | 8/2016 | Reese | B33Y 50/02 |
| 2016/0318257 A1* | 11/2016 | Brooks | B23P 6/007 |
| 2017/0066196 A1* | 3/2017 | Beard | B33Y 30/00 |
| 2017/0225400 A1* | 8/2017 | Lee | B29C 73/24 |
| 2017/0305135 A1* | 10/2017 | Albert | B33Y 10/00 |
| 2018/0081334 A1* | 3/2018 | Bostick | G05B 15/02 |
| 2018/0120747 A1 | 5/2018 | Nakachi | |
| 2018/0264590 A1* | 9/2018 | Goldfine | G01K 13/10 |
| 2018/0293587 A1* | 10/2018 | Oda | G06Q 30/06 |
| 2018/0370144 A1* | 12/2018 | Revanur | B29C 64/153 |
| 2019/0309733 A1* | 10/2019 | Grishauge | F03D 1/0675 |
| 2020/0047414 A1* | 2/2020 | Kothari | B33Y 10/00 |
| 2020/0166907 A1* | 5/2020 | Frederick | B33Y 10/00 |

FOREIGN PATENT DOCUMENTS

| | | |
|---|---|---|
| EP | 1281656 | 2/2003 |
| EP | 2626476 | 8/2013 |
| EP | 2641661 | 9/2013 |
| EP | 2570380 B1 | 3/2015 |
| EP | 3296412 | 3/2018 |
| WO | WO 2017/081200 | 5/2017 |
| WO | WO 2017/101911 | 6/2017 |
| WO | WO 2019/211393 | 11/2019 |

\* cited by examiner

METHOD AND DEVICE FOR MAINTAINING AND/OR REPAIRING A CONSTRUCTION MACHINE

CROSS-REFERENCE TO RELATED APPLICATIONS

This application is a continuation of International Patent Application Number PCT/EP2019/061281 filed May 2, 2019, which claims priority to German Patent Application Number DE 10 2018 110 742.0 filed May 4, 2018, the contents of which are incorporated herein by reference in their entireties.

BACKGROUND

The present invention relates to a device and a method for maintaining and/or repairing a construction machine, with a maintenance station comprising a 3D printer for printing replacement parts on the basis of component data and/or a mobile display device for displaying repair information on the construction machine on the basis of component data, wherein a data supply station, that can be connected to the maintenance station by way of a communication link, provides the maintenance station with component data for printing a replacement part and/or displaying repair information on the component.

The repair and maintenance of construction machines such as cranes, excavators, bulldozers and piling rigs is often time-consuming and demanding in terms of time and geography. Since at the construction sites different construction machines depend on each other in the way they operate together, a failing machine can often disable the whole construction site, even if the functioning of other construction machines would remain intact. If, for example, the crane breaks down, deliveries such as bricks or reinforcements cannot be unloaded or brought to the jobsite, or sheet piles cannot be supplied for the piling rig. For that reason, machine operators or manufacturers tend to demand very short reaction times and contractually agree them in order to prevent expensive downtime of the entire construction site. On the other hand, construction sites are often located a long distance from the machine operator or manufacturer, often even on different continents, and sometimes at places hard to get to or even inaccessible with no convenient airport connection for the replacement parts to be delivered quickly to the site. This can mean that often there is a need for expensive specialised transportation for bringing a replacement part or highly qualified, specialised maintenance personnel to the site. While machine operators, as for example crane operators, are familiar with the construction machines they operate and are also technically qualified, maintenance and repair often requires specific knowledge, which requires the presence of service technicians specialising in this particular equipment on site, sometimes even their flight.

It has therefore already been considered that a crane can be connected to a remote maintenance centre by way of a data communication link in order to request operating data from the crane from the remote maintenance centre and to import data sets from the remote maintenance centre to the crane, for example in the form of software updates or parameterisation, cf. EP 1 281 656 A1.

In EP 2 570 380 B1 it is further proposed to transmit the maintenance request from a remote maintenance computer by a cell phone connection to a tablet computer, which then requests operating parameters from the crane's control unit by way of a Bluetooth connection. If required, the remote maintenance computer can transmit the correction data to the crane computer by the interposed cell phone or tablet computer, for example to adjust the crane's parameterization.

Until now, however, these well-known remote maintenance systems have only made it possible to maintain and, if necessary, modify the crane's control software. However, none of the mechanical components of the construction machine can be repaired, removed, installed or replaced. Moreover, errors occurring during assembly, such as incorrectly inserted or incorrectly secured deflection rollers, cannot be corrected. Besides, these former remote maintenance systems are also affected in that they do not allow for the necessary connection of different system participants or, if they do allow it, they do not ensure the necessary data security. Generally, machine manufacturers do not agree to make the sensitive design data available to external third parties, for example those offering maintenance of different types of construction machines, and therefore a construction site operator would need different, individual data accesses to different manufacturers in order to obtain maintenance data for construction machines from different manufacturers. This encounters, however, poor level of acceptance. On the other hand, in some cases very detailed component data are required for a wide variety of components, as unexpected failures of components may occur during operation and therefore a wide variety of components will have to be replaced.

The present invention is therefore based on the task of enabling fast and reliable maintenance and repair of different components of different construction machines on site at a construction site, not requiring specially trained service technicians with experience in the respective machine type, and at the same time preventing the disclosing of sensitive know-how aspects.

SUMMARY

Said task is solved, according to the invention, with a device as claimed in claim 1 and a method as claimed in claim 20. Advantageous arrangements of the invention are the subject-matter of the dependent claims.

In one aspect, it is proposed that, in the event of a mechanical repair, a necessary mechanical replacement part of the construction machine will no longer have to be delivered by the manufacturer of the construction machine or from a distant depot of replacement parts, but will be printed on site or in the vicinity of the jobsite of the construction machine, using a 3D printer. The relatively extensive 3D printing data required thereby for enabling the 3D printer the printing of each replacement part is provided to the 3D printer or the maintenance station to which the 3D printer belongs through at least a two-step data communication structure that provides different levels of authentication and selection, and that holds different amounts of data at different levels of the data structure. On a first data structure level, component data for a large number of components of one or more construction machines are stored and/or kept ready, wherein on this first level, several machine data stations may be provided which can keep such component data ready for different construction machines produced by different manufacturers. Nevertheless, it is not the individual maintenance mechanic on site or the said local maintenance station that has access to this first data structure level, but only an interposed data supply station, which, on the one hand, can be connected to the maintenance station by way of a communication link and provides this maintenance station with the component data required, and, on the other hand, can communicate with the machine data station on the said first level by a communication link and receive the component data required there. It is thanks to the at least one interposed communication level, comprising the aforementioned data supply station, that the storage location of the sensitive component data remains concealed for the maintenance station. Nonetheless, the maintenance station can access component data of different components and/or different construction machines without keeping different communication channels ready or being registered with different manufacturers. On the one hand this improves data security, on the other hand the attractiveness of the system for the construction site operator is increased.

To increase the security, the different levels can communicate with each other using different security codes and/or certificate check. In particular, the maintenance station can be equipped with a request module for requesting component data for a given component of a given construction machine from the data supply station, which request module together with the component data request transmits an identifier and/or a key to the data supply station or keeps it ready on request. An authentication module in the data supply station can check and/or decrypt the identifier and/or the transmitted key received from the maintenance station to determine whether the maintenance station is authorized to receive the requested component data or is even authorized to exchange data with the data supply station. If this authentication check by the data supply station is positive, i.e. the maintenance station is authorized to request the said component data, the data supply station selects the relevant machine data station based on the component data request received from the maintenance station and requests the required component data from it.

The request of the data supply station to the machine data station can again be combined with a second authentication step, wherein the data processing station can transmit an identifier and/or a key to the machine data station or provide it to the machine data station on request. An authentication and/or decryption module of the machine data station can check the transmitted identifier and/or key for authorization and/or decrypt it to determine whether the data supply station is authorized to receive the requested component data or even to communicate with the machine data station.

If the machine data station determines that the data processing station is authorized to receive the requested part data, the machine data station provides the said part data or transmits these component data to the data supply station, which can then transmit the received component data to the maintenance station. The machine data station, that stores a variety of different component data, can select a data set from the stored pool on the basis of the request received from the data supply station, so that the data supply station receives only the component data which is actually required.

The component data so transmitted to the maintenance station may in particular include 3D printing data and/or component geometry data, on the basis of which the maintenance station can generate 3D printing data, which 3D printing data can then be used by the said 3D printer to print the respective replacement part.

Such a 3D printer has been designed in order to build up the respective component or replacement part layer by layer on the basis of the received component data and the 3D printing data derived from it and/or contained therein, wherein layers of material can be liquefied and/or solidified layer by layer, using an energy beam. For example, one or more materials can be applied in layers in pulverulent and/or paste-like and/or liquid form and melted or solidified and/or cured and/or chemically reacted by a laser beam or electron beam or plasma beam to form a cured layer. Thanks to such production using 3D printing technology, the replacement part requiring repair or maintenance can be fabricated directly or close to the jobsite of the construction machine, significantly reducing transportation costs by eliminating the need for expensive delivery or air shipment of the replacement part from a central depot by simply transferring the manufacturing data required for the 3D printer.

The 3D printing data can be used to print simple replacement parts, such as rollers, gears, bolts or brackets, fast and cost-effectively at the construction site or at the jobsite of the construction machine, thus minimizing the time required for components delivery. On the other hand, more complex replacement parts for engines, winches, hydraulic cylinders, drives, switch cabinets or other subassemblies of a construction machine can also be printed.

In order to avoid downtime, especially for more complex replacement parts due to the longer 3D printing process, the 3D printing data for a given component can also be provided through a failure prediction system or controlled by a ready-for-replacement signal, which can be generated on the basis of the recorded operating data and/or recorded or given component characteristics. For this purpose, the said maintenance station, alternatively or additionally also the data supply station and/or the machine data station and/or the control device of the respective construction machine, can be connected to a maintenance device, in which operating data and/or characteristics of the construction machine and/or its components relevant to the service life are collected and evaluated in order to estimate or predict the service life and, depending on the collected data, to generate a ready-for-replacement signal, that indicates the readiness for replacement of a respective component in time to allow time for a 3D printing process or another replacement part supply. In particular, by the presence of the ready-for-replacement signal, said maintenance station may initiate and/or request transmission of the 3D printing data to the 3D printer. This allows for the 3D printing process to be initiated in time for the replacement part to be at hand when the original or worn component threatens to fall out of use.

As an alternative to importing 3D printing data from the data supply station or machine data station, a component to be replaced can also be scanned and scanned on site by a 3D scanner so that the 3D scan data of the defective or worn component can be used to trigger the 3D printer and print the replacement part.

In a further aspect, component data containing repair information can also be transmitted from a machine data station to the maintenance station in the manner described above, with the interposition of the data processing station, in order to display repair information on the said mobile display device of the maintenance station on the basis of the transmitted component data. Such repair information may, for example, include instructions regarding the mounting and/or dismounting steps to be taken for mounting and/or dismounting a replacement part, for example in the form of written and/or picture instructions. In particular, such repair and/or maintenance information may also include a picture and/or drawing presentation of the component to be repaired or maintained and the component and mounting environment of the said component, in order to provide the local maintenance mechanic with a clear visualisation of the repair or maintenance.

In particular, the position and/or alignment of the component to be repaired or maintained can be overlaid onto such a picture or drawing of the mounting environment.

Said mobile display device may include, for example, a tablet or a screen that is portable in another way. Alternatively or additionally, the display device can also include an augmented reality device that shows an image of the component to be maintained and/or repaired and/or its mounting environment on a display and, if required, overlays additional repair information onto the image, for example in the form of text information.

Such an augmented reality system is a computer-aided image display system by means of which an image of the component mounting environment is superimposed with computer-generated additional information.

In an advantageous further development of the invention, the image of the component mounting environment shown on the display may be a live image or a recorded image provided by a camera directed at the component mounting environment to be mounted. The advantage of using a live image, which always reflects the current state of the assembly, is a clearer alignment of the actual reality and the reality displayed in the image, so that, in this situation, the worker can finally handle his work more easily. If necessary, the image can also be temporarily stored or recorded and displayed to the operator with a time delay. As an alternative or in addition to an ACTUAL image of the component mounting environment provided by a preferably digital camera, a computer-generated, virtual image of the component mounting environment can also be displayed. Such a virtual image of the component mounting environment can be provided by a three-dimensional CAD system, for example, which shows the components and their arrangement.

The image shown on the display can be a live image such as a video image of the ACTUAL state of the component mounting environment. Alternatively, it is also possible to display a frozen image that is updated only at larger intervals of, for example, a few seconds. This freezes the ACTUAL state of the component mounting environment, so to say, and facilitates detailed observation by making fewer changes. For example, it is also possible to display a frozen image that is only updated at the pace of the work steps, which is updated and shown on the display cyclically or after each repair or assembly step that has been carried out.

The image of the component mounting environment displayed to the operator is therefore advantageously adapted continuously or cyclically to the progressing repair or maintenance status of the component mounting environment. Whilst a complete picture of the component mounting environment with the "old" components to be repaired is created at the beginning of the repair process, a reduced picture of the mounting environment with only a few basic components such as support frames and/or without any replacement components to be mounted can be displayed in an intermediate stage after removing the component to be repaired and any neighboring components to be added, where an increasingly detailed picture of the component mounting environment can be displayed as reassembly progresses and a picture of the component mounting environment with more and more components and connections to each other can be displayed towards the end of the mounting process. The said adjustment of the displayed image to the progressing repair status can be realized in the said manner by displaying a live image or a stored, previously captured real image. Alternatively or additionally, the image, e.g. a computer-generated design image and/or a camera image, can be gradually modified depending on the identified and assembled components, e.g. in such a way that if the components are correctly assembled, they are embedded in the image to be displayed by computer. The image displayed to the operator changes therefore advantageously and is adapted to the actual condition of the construction machine.

The said image of the component mounting environment, which shows the components to be repaired and their connection points, can basically be shown on different displays. For example, the display can be a screen placed beside the construction machine or a screen placed at least in the vicinity of the component mounting environment on which the said image is displayed.

In an advantageous further development of the invention, the image of the component mounting environment can also be displayed on data glasses worn by individual workers during the mounting process. Such data glasses can include, for example, a display that can be positioned within the range of a standard spectacle lens, which can, for example, be pivoted on the spectacle frame so that it can be pivoted in front of the eye or away from the eye. Alternatively or additionally, the display can also work in the form of a head-up display that can project the image onto the lens through which the worker can see. Such data glasses are known per se and described for example in DE 20 2012 003 317 U1 or DE 20 2012 003 332 U1, to which reference may be made in this respect with regard to the design of data glasses.

In order to be able to display the connection points of the components to be replaced or mounted and their target position in the image of the component mounting environment, the said augmented reality system or computer-aided image generation system can advantageously have a CAD interface to take the connection points of the components to be repaired or mounted and their target position in the component mounting environment from a CAD system to which the augmented reality system can be connected. Such a CAD system can, for example, store the assembly drawing of the component mounting environment or, in particular, be the CAD system on which the component mounting environment and/or the assembly drawing thereof was generated. As an alternative to a direct connection to the aforementioned CAD system, the augmented reality system can also be supplied with a CAD data set that reproduces the component mounting environment and/or its assembly drawing, wherein such a CAD data set can advantageously be supplied in the previously described, multi-stage form, for which the augmented reality system and/or the maintenance station can have a corresponding interface.

Advantageously, the augmented reality system and/or its insertion device can be used to display and/or overlay not only the connection point of a component but also its position and/or its alignment and/or its mounting position in the component mounting environment, thus allowing the operator to see where exactly in the component mounting environment the respective component is to be positioned and mounted. This allows the ACTUAL position and/or ACTUAL alignment of the component recorded by the camera and/or the ACTUAL position of its connection point on the display to be superimposed on the corresponding DESIRED position and/or DESIRED alignment, which can be obtained from the CAD data or taken from the said CAD file, in order to clarify deviations of the mounted ACTUAL position or ACTUAL alignment from the DESIRED position or DESIRED alignment.

Advantageously, the maintenance station can comprise an identification device by means of which a component to be repaired, maintained or replaced can be automatically identified, wherein such an identification device can be divided into different levels of the data structure already outlined above, in particular in that an identification module determines characteristics of a component to be repaired or maintained on site at the construction machine and these determined characteristics are then evaluated on another level, for example the aforementioned second level of the data supply station and/or the first level of the machine data station, for example by means of an evaluation module which may be provided in the aforementioned supply station and/or in the machine data station or may be connected thereto in each case.

For example, the characteristics determined at the maintenance station can be transmitted to the data supply station and/or the machine data station together with the request for component data and evaluated by the said evaluation module.

The identification device for the identification of a component to be connected in each case can basically be designed differently. For example, the component to be identified—which needs to be repaired, possibly replaced and/or mounted—can be identified on the basis of a marking applied to the component, for example in the form of a bar code and/or a letter or number code and/or another character code and/or a geometrical shape marking. For example, the identification device may comprise a barcode or QR code reader. Alternatively or additionally, identification can also be carried out in another way, for example by means of an RFID chip.

In particular, the component to be repaired and/or maintained can also be identified by means of an image evaluation device which can identify the component by its contour and/or size and/or color and/or surface properties such as light reflecting, mirroring, etc. In particular, the image evaluation unit can evaluate the image data provided by the camera observing the component mounting environment.

Alternatively or additionally, a respective component can also be identified by the identification device on the basis of its dimensions of its main extension axes and/or its diameter and/or its geometry.

In further development of the invention, this enables the worker to simply hold a component to be repaired or replaced in the camera field of the camera observing the component mounting environment or in the scanning area of a scanning device before the component is actually replaced or mounted. The image evaluation unit can then identify the component shown in the image provided by the camera using one of the above-mentioned criteria such as a bar code, QR code or similar.

In further development of the invention, the augmented reality system can also be used to monitor individual or all maintenance or repair steps. Here, the ACTUAL image of the arrangement of the components recorded by the camera of the augmented reality system can be compared to the DESIRED arrangement of the components, as it can be obtained from the CAD data. Here, the image evaluation system identifies the individual components in the camera image, e.g. by means of the aforementioned bar or OR code, and the connection points to which the identified component was connected. If the identified connection points or fasteners deviate from the DESIRED state according to the assembly drawing, as it can be obtained from the CAD system or also by a preceding teach-in procedure, an error message can be output and the corresponding error location can be marked on the camera image shown on the display.

In addition to the complete repair, partial steps of the repair process can also be monitored by the monitoring device.

Alternatively or additionally, the monitoring device can monitor whether the correct tool is used during a maintenance or repair step, for example, the correct wrench for tightening screws. Alternatively or additionally it can be monitored, whether a suitable screw and/or bearing with the correct cross section is installed.

Alternatively or additionally, the monitoring device can also monitor and detect faulty assemblies. If, for example, a component is not found or identified at the position specified in the drawing, an error message can be displayed, e.g. by displaying an error symbol at the wrong position in the camera image.

In further development of the invention, the maintenance or repair can also be documented by means of the said augmented reality system, for example in the case of safety-critical components, in order to be able to provide evidence of repair or maintenance at a later date.

Alternatively or additionally, in further development of the invention, there can be displayed assistance for the worker if required, for example on the display mentioned above. Such help can include, for example, texts that are overlaid or videos that can be played on the display.

Advantageously, the augmented reality device and/or its camera or a camera can also be used to identify a component to be repaired and/or replaced during the repair or maintenance process and/or to accompany or perform troubleshooting and/or maintenance or repair instructions supported by an expert communicatively connected via the data supply station and/or the machine station. For example, the augmented reality module can be used to identify a defective component by having a service technician—who is not necessarily on site—follow the transmitted actual image of the mounting environment on a screen, use the augmented reality system to provide repair instructions and/or maintenance steps which the worker then carries out on site, and use the transmitted camera image to identify a component to be replaced or repaired.

Advantageously, the augmented reality setup described above and the 3D printer setup can also achieve particular advantages when used together. In particular, the augmented reality module can be used to identify a defective part, which can then be reprinted by requesting data from the data supply station and importing the 3D printing data, or, if necessary, by using a local 3D scanner and then reprinting the 3D printer using the 3D scanning data provided by the 3D scanner. This allows for cost- and time-optimized repair, although it may also include the ability to call in a manufacturer's expert online to assist with troubleshooting and/or repair and/or 3D recording and/or 3D printing.

If a ready-for-replacement signal is generated in the said manner by a maintenance station, in particular a so-called predictive maintenance system, both the transmission of the 3D printing data and the transmission of the augmented reality data to the augmented reality facility can be initiated and/or requested depending on this ready-for-replacement signal.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
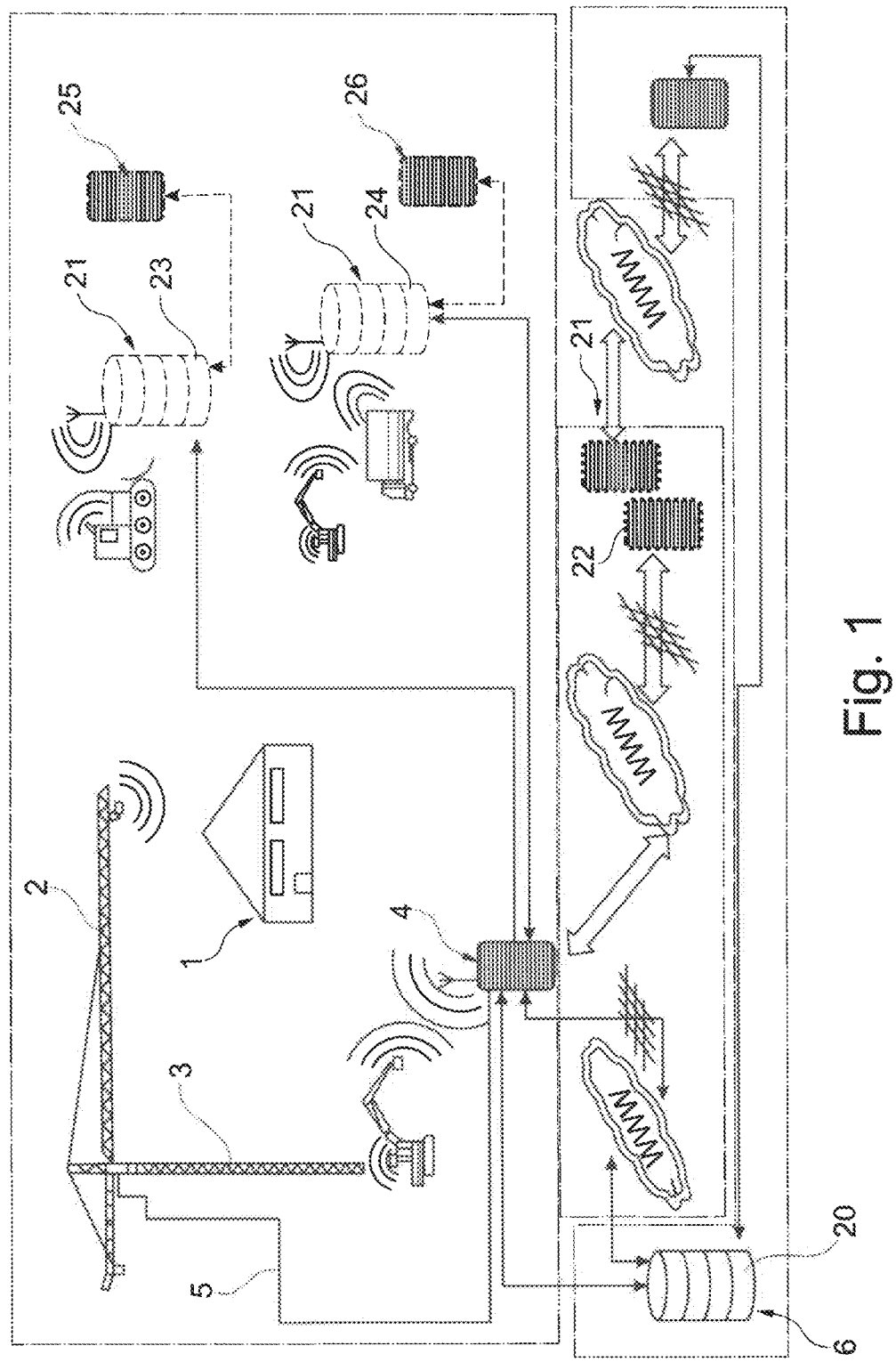
FIG. 1: a schematic overall view of a device for maintaining and/or repairing a construction machine according to an advantageous embodiment of the invention, showing the data and communication structure of the data supply station and the machine data stations with each other and the connection of the local construction site or maintenance station.

As the figures show, especially FIG. 1, the device for maintaining and/or repairing a construction machine can have an interlocking data and communication structure on different levels, which makes it possible to provide sensitive construction machine data, such as design data of components or replacement parts, 3D printing data for a replacement part, service, maintenance and repair instructions, operating instructions, certification or verification data, change information from the manufacturer and/or project data, for example in the form of BIM data, locally at a construction site or at the jobsite of the construction machine, while at the same time preventing the misuse of data. For example, at a construction site 1—or generally at a jobsite—a first construction machine 2 can be operated for example in the form of a crane and a second construction machine 3 for example in the form of an excavator, which can originate from the same manufacturer or from different manufacturers.

A local central control unit 4 can communicate with the construction machines 2, 3 of construction site 1. On the one hand, operating data such as operating times, measurement data or general feedback from construction machines 2, 3 can be transmitted to the central control unit 4. Alternatively or additionally, the central control unit 4 can reciprocally transmit data and/or signals to the construction machines 2, 3, for example in the form of control commands which the respective construction machine 2, 3 can carry out automatically or under the control of a machine operator, and/or transmit display data or similar to the respective construction machine 2, 3.

The central control unit 4 can communicate here with the construction machines 2, 3 wirelessly, for example over radio or in the close range also over Bluetooth or similar communication standards. Alternatively or additionally, data can also be transmitted via a data line 5, cf. FIG. 1.

Figure 2:
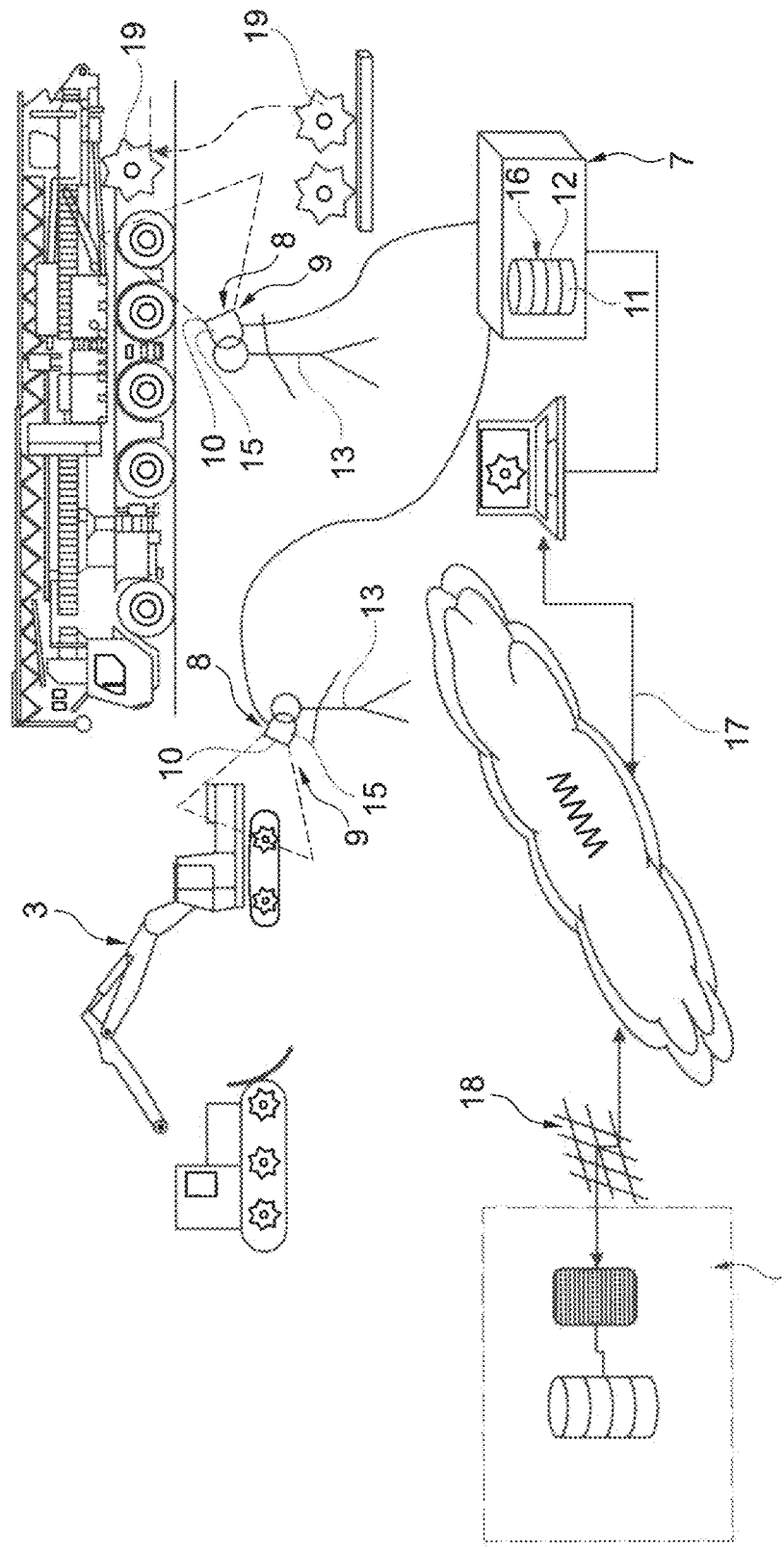
FIG. 2: a schematic diagram of the local maintenance station comprising an augmented reality device and its connection to the data supply station
Figure 3:
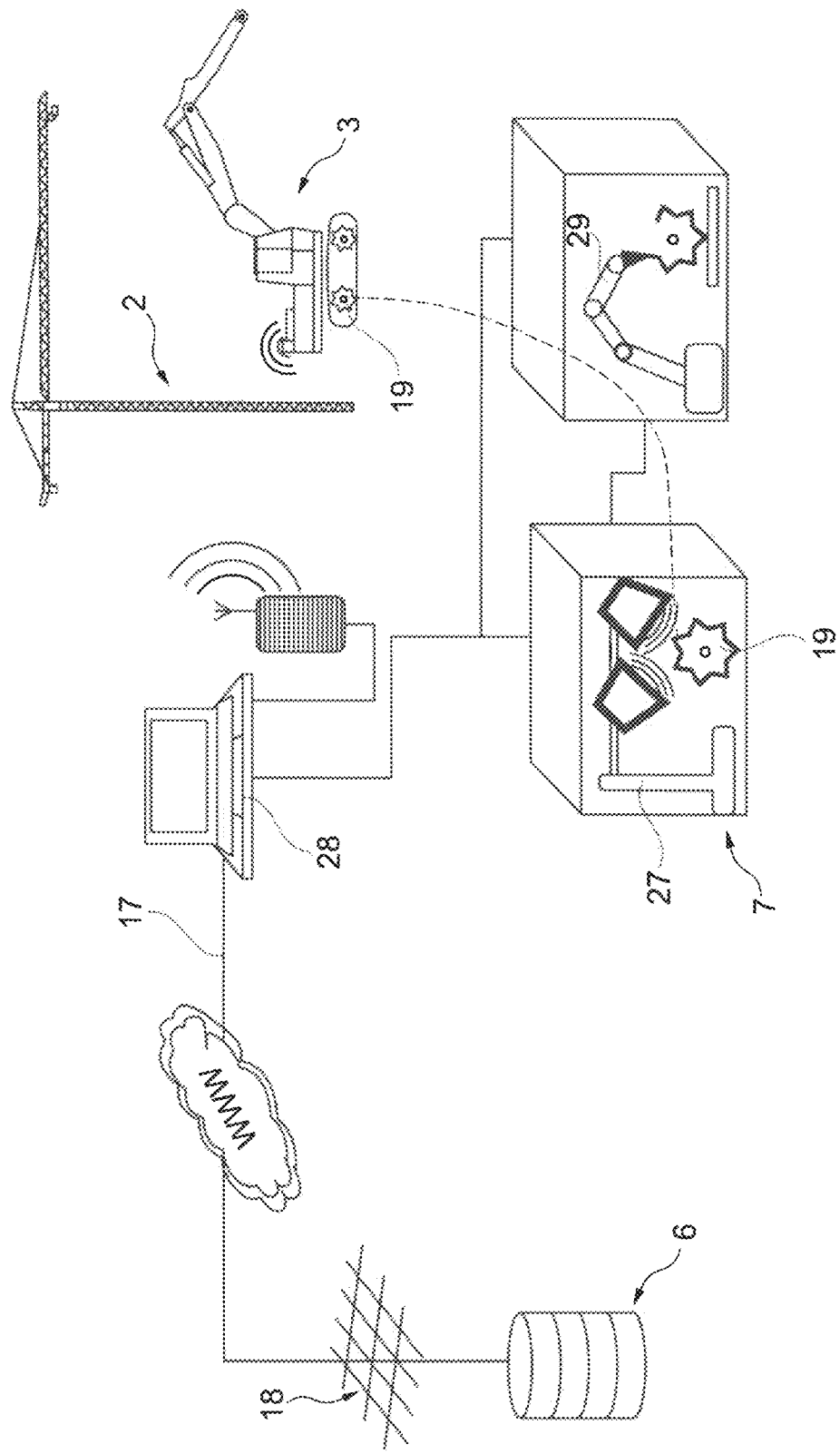
FIG. 3: a schematic diagram of the maintenance station including a 3D printing device and a 3D scanner, and the connection of the maintenance station to the data supply station.
Figure 4:
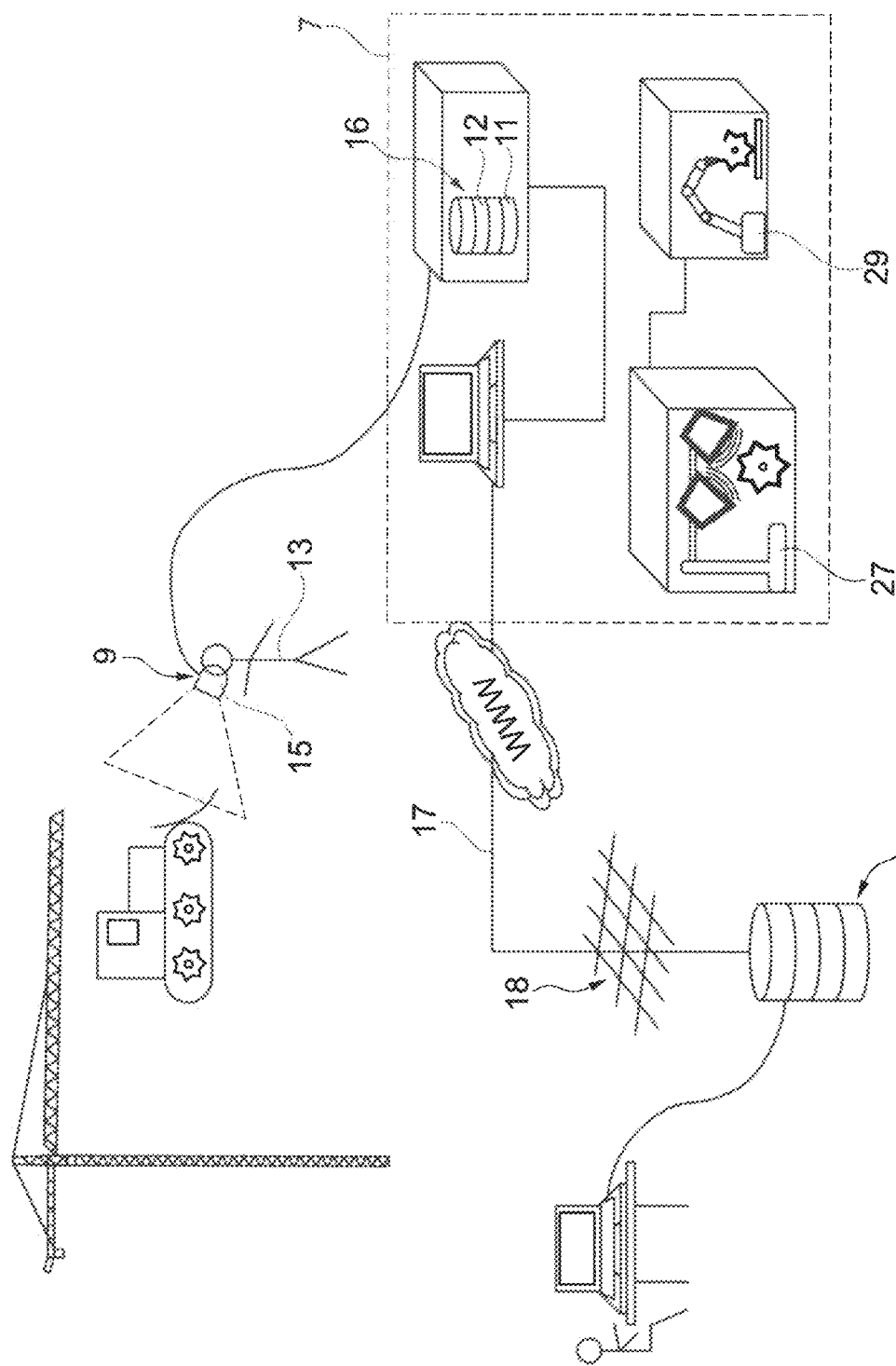
FIG. 4: a schematic diagram of the maintenance station comprising both an augmented reality device and a 3D printing device and its connection to the data supply device, wherein the maintenance station is supported online by a maintenance and repair expert who is connected to the augmented reality device via the data supply station.

The local central control unit 4 forms at least one part of a data processing station 6, via which a maintenance station 7 provided on site 1 can be supplied with component data which is required or at least helpful for the maintenance and/or repair of a component of one of the construction machines 2, 3, wherein the said maintenance station 7 and its possible configurations are shown in more detail in FIGS. 2 to 4.

As shown in FIG. 2, the maintenance station 7 may include a display device 8 for displaying repair information on the respective construction machine, wherein the said display device 8 being mobile and can be worn on the body of an individual worker. In particular, the said display device 8 may include an augmented reality device 9. Using such an augmented reality system 9, the worker can be shown in particular a picture of the respective construction machine and/or, in sections, a picture of the mounting environment of a given component of the construction machine, and computer-aided information in the form of symbols, markings, characters, videos and similar items can be displayed, which may contain, for example, maintenance and/or mounting instructions, identify connection points, display DESIRED positions and DESIRED alignments of a component to be replaced or contain other information helpful for repair or maintenance.

As FIG. 2 or FIG. 4 shows, the augmented reality system 9 can include at least one camera 10, which observes a respective construction machine 2, 3 and provides an actual image of the mounting environment of a component or the whole construction machine.

From a server or a computer 16 of the augmented reality system ARS, the camera image is shown on at least one display of the display device 8. This display can include a screen installed next to the construction machine.

Alternatively or in addition, the display can also have an eyeglass display integrated into data glasses, cf. FIG. 2, which, for example in the manner of a projector or a head-up display, can show the images and information to be displayed on a lens or a screen surface similar to a lens, which can be positioned in front of one eye of the worker.

As FIG. 2 shows, the said data glasses 15 can also integrate the said camera 10 or an additional camera 10, which can also be part of the ARS augmented reality system or can be connected to the said computer 16 in order to be superimposed with additional information to be overlaid, which in turn is then shown on one of the displays.

As FIG. 2 shows, the computer 16 of the augmented reality system 9 can be connected to the data processing station 6, from which information about the components to be serviced, their connection points, their nominal position and their nominal alignment in the construction machine 2 and/or in particular also their circuit diagram or wiring diagram can be obtained.

For this purpose, the augmented reality system 9 can first identify a component 2 to be installed by means of an identification device 11. An image evaluation device 12 and/or a scanning device or another reading device may be provided which can evaluate a marking on component 2, for example in the form of a bar or QR code. If such a bar code, QR code or marking is recognized in the image data provided by the camera 10, the component can be identified, for example by accessing data from the data processing station 6, in which corresponding information can be stored for the recognized bar code. As an alternative or in addition to such recognition by means of a bar or QR code or marking, the identification device 11 can also identify a component by its shape and/or contouring and/or color or other characteristics.

Such identification of the component by shape and/or contouring and/or color or other characteristics can also be made with the aid of data provided by the data processing station 6.

Alternatively or additionally, a component to be repaired or replaced can also be automatically identified by a preview maintenance system or a maintenance station, depending on the recorded operating data of the construction machine and/or the component and/or on recorded characteristics of the component and/or the construction machine. Such maintenance systems predicting the service life or replacement readiness can, for example, record operating data such as operating hours, load cycles, load amplitudes, climatic operating conditions such as salt content of the air or temperatures or soot particle content and/or sensor and evaluate component characteristics such as metallic abrasion particle content in the oil reservoir, lead-in grooves or cracks in highly stressed components such as gears or rope drums in order to estimate the remaining service life. An analysis module, which is configured to evaluate the acquired operating data and/or the given component characteristics, can generate a ready-for-replacement signal depending on the said data and characteristics.

As FIG. 2 shows, the computer 16 of the augmented reality device 9, which can be part of the maintenance station 7, is connected to the data supply station 6 via a remote data connection, e.g. the Internet, wherein such a communication connection 17 can be secured by a firewall 18 or a similar data security device, cf. FIG. 1.

If a component 19 to be serviced or replaced—for example a gear wheel according to FIG. 2—is identified in this way, the data supply station 6 can send component data to the maintenance station 7, which can then be displayed as repair information on the data glasses 15. These can be diagrams and/or information on the mounting environment, on the alignment of the component to be mounted and further, supplementary information, for example in the form of textual information, which makes it clear to the worker with which steps and where exactly the component is to be mounted.

The corresponding data request from the maintenance station 7 to the data supply station 6 or the communication between these two stations can advantageously be submitted to a check of the authorization of the maintenance station 7 regarding the requested component. For this purpose, codes and/or keys and/or similar security queries can be exchanged between the maintenance station 7 and the data supply station 6 and checked by the latter, so that the data supply station 6 then only provides the respective component data to the maintenance station 7 if the maintenance station 7 is also authorized to do so.

Said data supply station 6, which may belong to a system service provider, can obtain the required component data in different ways. As shown in FIG. 1, the data supply station 6 of the system service provider can be connected with the said local control unit 4 to a central computer or server 20 of the system service provider, either via a permanently installed data line or via the Internet, if necessary with the interposition of a further firewall. The computer or server 20 of the system service provider can then obtain the data from one or more machine data stations 21, wherein these machine data stations 21 can store a large number of component data for a large number of components of one or more construction machines, i.e. the data available in the machine data station 21 is far greater than the component data actually required.

As shown in FIG. 1, such a machine data station 21 can, for example, comprise a data cloud 22 to which the data supply station 6 has access, which can be done, for example, via the Internet, possibly with the interposition of a firewall 18. This access of the data supply station 6 to the data cloud 22 is also advantageously carried out by checking the access authorization or authorization of the data supply station 6. For this purpose, codes or keys or other security algorithms can be exchanged in the manner already mentioned and checked by a cloud computer so that the data supply station 6 only has access to such data to which the data supply station 6 is authorized.

As shown in FIG. 1, the local control unit 4 of the data supply station 6 can also access the said data cloud 22 directly without the detour over the computer 20, wherein the corresponding authentication check can in turn take place here.

As an alternative or in addition to such a data cloud 22, data supply station 6 can also retrieve the required data from machine data stations 21 of the respective machine manufacturers, wherein such additional machine data stations 21, cf. FIG. 1, can each have manufacturer computers 23 or 24 in which the said multitude of component data can be stored. It is also advantageous to check the authentication in this way. If necessary, alternative local control units 25, 26 can also communicate with the manufacturer's computers 23, 24.

As shown in FIG. 3, the maintenance station 7 may also include a 3D printer 29 that can be used to reprint parts of a particular construction machine 2 on the basis of 3D printing data. Such 3D printer 29 can be controlled by a maintenance station 7 print control computer 28, wherein the said maintenance station 7 print control computer 28, which may be part of the said construction site control computer device, can request and obtain the required data from the data supply station 6. For this purpose, the print control computer 28 can, for example, be connected to the data supply station 6 via a fixed data line or also via the Internet, advantageously again with the interposition of a firewall 18 or a similar security device. The print control computer 28 is also checked in the same way as described above with regard to its authorization to request the respective component data.

If the maintenance station 7 is authorized to reprint a given component, the data supply station 6 sends the corresponding 3D printing data to the maintenance station 7, whose print control computer 28 then controls the 3D printer 29 accordingly to build up the required component layer by layer.

The said 3D printing data can be obtained from the data supply station 6 in the same way as the component data required for the augmented reality device 9, as described above, from one or more machine data stations 21, for example from the data cloud 22 or one of the individual manufacturer's computers 23 or 24.

As further shown in FIG. 3, the maintenance station 7 can also be equipped with a 3D scanner 27, with the help of which a component to be repaired can be scanned and its geometry and/or design data of a component to be repaired can be generated by scanning. For example, as FIG. 3 shows, if a part 2 is to be reproduced in the form of a gear wheel, the 3D scanner 27 scans the worn gear wheel and generates a 3D part data set which is then fed to the 3D printer 29—or its print control computer 28—to reprint the component using the scanned 3D data.

As shown in FIG. 4, it is particularly advantageous for the maintenance station 7 to have both the augmented reality device 9 described above and the 3D printing device 29 described above and, if applicable, the corresponding 3D scanner 27.

As already explained, an additional expert 30 can also be involved via the image data generated by the augmented reality system 9, advantageously via the data supply station 6, to which the worker 13 can be connected in order to follow the images generated on the construction machine on a screen and, reciprocally, to send repair instructions and/or control commands for the 3D printer to the construction site.

In order to increase data security, it may be provided that the data supply station 6 and/or the machine data station 21 comprises a time-blocking device configured to limiting the providing of the data by the data supply station 6 and/or by the machine data station 21 to a predetermined time period.

It may also be advantageous that the authentication module of the data supply station 6 and the authentication module of the machine data station 21 are designed differently and/or are configured to check different authentication criteria, in particular codes and/or keys.

With the described system, maintenance and repair of a construction machine at a construction site can be carried out easily and safely. In particular it can be provided for maintaining and/or repairing a construction machine 2, 3 at the jobsite of the construction machine, using a mobile maintenance station 7 that can be placed at the job site of the construction machine, comprising a 3D printer 29 for printing replacement parts 19 for the construction machine 2, 3 on the basis of component data that in response to a request from the maintenance station 7 3D printing data for printing the replacement part is provided by way of a communication link to the maintenance station 7 from data supply station 6 that is at a separate location, and by the maintenance station 7 on the basis of the 3D printing data received from the data supply station 6 the replacement part 19 is printed layer by layer, using the 3D printer 29 at the jobsite of the construction machine 2, 3.

Thereby, it can be provided that the said 3D printing data is provided to the data supply station 6 by way of a communication link from a machine data station 21 that is at a separate location from the maintenance and data supply stations, wherein, in addition to said 3D printing data, a plurality of component data for further components of the construction machine 2, 3 or of another construction machine are kept ready in a storage device at the said machine data station 21, wherein a given component data set for the component 19 to be repaired is selected by the data supply station 7 and/or the machine data station 21 from the plurality of component data that have been stored on the basis of a data set request sent by the maintenance station and is provided to the maintenance station.

Further, it may be provided for maintaining and/or repairing a construction machine 2, 3 at the jobsite of the construction machine, using a mobile maintenance station 7 that is placed at the jobsite of the construction machine, comprising a 3D printer 29 for printing replacement parts 19 for the construction machine 2, 3 on the basis of the component data and/or a mobile display device 8 for displaying repair information on the construction machine 2, 3 on the basis of the component data, that an image of the component 19 to be repaired and of the mounting environment of the component to be repaired is shown on a display by means of an augmented reality device 9, and a mounting position of the component 19 to be repaired in the mounting environment is overlaid onto the displayed image on the display, wherein augmented reality data for overlaying the component information and/or position in the mounting environment is transmitted to the maintenance station 7 by way of a communication link from the data supply station 6 in response to a request from the maintenance station, wherein the mounting position of the component 19 to be repaired in the mounting environment is overlaid onto the displayed image on the display, depending on the augmented reality and/or component data transmitted from the data supply station 6 to the maintenance station 7.

Thereby, it can be provided that the said augmented reality data is provided to the data supply station 6 by way of a communication link from a machine data station 21 that is at a separate location from the maintenance and data supply stations, wherein, in addition to the said augmented reality data, a plurality of component data for further components of the construction machine 2, 3 or of another construction machine are kept ready in a storage device at the said machine data station 21, wherein, in addition to the said augmented reality data, a plurality of augmented reality and component data relating to further components of the construction machine 2, 3 or of another construction machine are kept ready in a storage device at the said machine data station 21, wherein a given augmented reality data set for the component 19 to be repaired is selected by the data supply station 7 and/or the machine data station 21 from the plurality of stored augmented reality and component data on the basis of a data set request sent by the maintenance station and is provided to the maintenance station.

We claim:
1. A device for maintaining and/or repairing a construction machine with a mobile maintenance station placeable at a construction jobsite, comprising:
   a 3D printer for printing a replacement part for the construction machine on the basis of component data; and
   a mobile display device for displaying repair information on the construction machine on the basis of the component data; and
   a data supply station, wherein the mobile display device comprises an augmented reality device that displays on a display an image of a component to be repaired and a mounting environment of the component to be repaired, and overlays a mounting position of the component to be repaired in the mounting environment onto the image on the display,
   wherein the data supply station is configured to provide the mobile maintenance station with augmented reality data for overlaying component information and/or position in the mounting environment, wherein the mobile maintenance station is configured to overlay the mounting position of the component to be repaired in the mounting environment onto the image on the display depending on the augmented reality data and/or the component data, and wherein the component data is obtainable from the data supply station,
   wherein the mobile maintenance station and/or the data supply station comprises an identification device for identifying the component to be repaired,
   wherein the identification device comprises an image evaluation device for evaluating images of the component to be repaired and/or the mounting environment of the component to be repaired taken by a camera and identifying the component to be repaired from the images on the basis of its dimensions of its main extension axes, and/or its diameter, and/or its geometry, and
   wherein the augmented reality device comprises a controller for continuously or cyclically adapting the image of the mounting environment of the component to be repaired shown on the display to a real-time repair status of the construction machine, and wherein the controller is configured to gradually cease to display disassembled components in the image of the mounting environment during repair and/or is configured to gradually display newly assembled components in the mounting environment during repair.

2. The device of claim 1, wherein the data supply station is at a separate location from the mobile maintenance station, wherein the data supply station is connected to the mobile maintenance station by a first communication link and is configured to provide the mobile maintenance station with 3D printing data for printing the replacement part, and wherein the mobile maintenance station is configured to print the replacement part layer by layer on the basis of the 3D printing data received from the data supply station, wherein the data supply station is connectable to a machine data station by a second communication link, wherein the machine data station is at a separate location from the mobile maintenance station and the data supply station, wherein the machine data station is configured to provide the 3D printing data to the data supply station, wherein the machine data station comprises a storage device in which the 3D printing data and a plurality of component data relating to further components of the construction machine or another construction machine are stored, and wherein a component data set from the plurality of component data is selectable by the data supply station and/or the machine data station on the basis of a data set request sent by the mobile maintenance station.

3. The device of claim 2, wherein the machine data station comprises an authentication module for checking an authorization of the data supply station to obtain predetermined component data.

4. The device of claim 2, wherein the data supply station comprises a data supply station authentication module for checking an authorization of the mobile maintenance station to receive the component data, wherein the machine data station comprises a machine data station authentication module for checking an authorization of the data supply station to obtain predetermined component data, and wherein the data supply station authentication module and the machine data station authentication module are configured to check different authentication criteria comprising encoding and/or keys.

5. The device of claim 2, wherein the machine data station comprises a data cloud in which component data of a plurality of components of a plurality of construction machines are stored.

6. The device of claim 1, wherein the 3D printer has a movable application head or a triaxially movable application head for a layer by layer applying of at least one of a pulverulent material, a paste-like material, and a liquid material, and wherein the 3D printer has an irradiation head for irradiating applied material layers with a laser beam or electron beam or plasma beam to at least one of melt, solidify, cure, and chemically react the applied material layers to form cured layers.

7. The device of claim 1, wherein the mobile maintenance station comprises a 3D scanner for detecting a component to be repaired and for providing 3D scan data characterizing the component to be repaired, and wherein the 3D printer is configured to print the replacement part for the component to be repaired based on the 3D scan data.

8. The device of claim 1, wherein the data supply station is connectable to a machine data station by a communication link, wherein the machine data station is at a separate location from the mobile maintenance station and the data supply station, wherein the machine data station is configured to provide the augmented reality data to the data supply station, wherein the machine data station comprises a storage device for storing a plurality of augmented reality data and/or component data of a plurality of further components of the construction machine or a further construction machine, and wherein an augmented reality and/or component data set from the plurality of augmented reality data and/or the component data is selectable by the data supply station and/or the machine data station on the basis of a data set request sent by the mobile maintenance station.

9. The device of claim 1, wherein the identification device comprises a code reader or a bar code reader for reading a marking on the component to be repaired.

10. The device of claim 1, wherein the image evaluation device comprises a color evaluator for identifying the component to be repaired on the basis of a color of the component to be repaired.

11. The device of claim 1, wherein the image is provided by a camera directed at the construction machine, and wherein the image is displayable on the display in the form of a live image and/or a recorded image.

12. The device of claim 1, wherein the display and/or a camera are integrated with data glasses wearable by a worker.

13. The device of claim 1, wherein the augmented reality device comprises a computer-aided design (CAD) data interface, wherein the data supply station is configured to provide the mobile maintenance station with CAD data on the component to be repaired and/or on the mounting environment of the component to be repaired, and wherein a CAD representation of the component to be repaired and/or the mounting environment is displayable by the augmented reality device based on the CAD data.

14. The device of claim 1, wherein the data supply station comprises an authentication module for checking an authorization of the mobile maintenance station to receive the component data.

15. The device of claim 1, wherein the mounting environment of the component to be repaired comprises an arrangement of components.

16. The device of claim 1, wherein the mounting environment of the component to be repaired comprises a portion of the construction machine different from the component to be repaired.

17. A method for maintaining and/or repairing a construction machine at a jobsite of the construction machine, using a mobile maintenance station placeable at the jobsite of the construction machine, comprising a 3D printer for printing a replacement part for the construction machine on the basis of component data and/or a mobile display device for displaying repair information on the construction machine on the basis of the component data, wherein an image of a component to be repaired and of a mounting environment of the component to be repaired is shown on a display by an augmented reality device, wherein a mounting position of the component to be repaired in the mounting environment is overlaid onto the image on the display, wherein augmented reality data for overlaying the component information and/or position in the mounting environment is transmitted to the mobile maintenance station by a first communication link from a data supply station in response to a request from the mobile maintenance station, and wherein the mounting position of the component to be repaired in the mounting environment is overlaid onto the image on the display depending on the augmented reality data and/or the component data transmitted from the data supply station to the mobile maintenance station, wherein the mobile maintenance station and/or the data supply station comprises an identification device for identifying the component to be repaired, wherein the identification device comprises an image evaluation device for evaluating images of the component to be repaired and/or the mounting environment of the component to be repaired taken by a camera and identifying the component to be repaired from the images on the basis of its dimensions of its main extension axes, and/or its diameter, and/or its geometry, and wherein the augmented reality device comprises a controller for continuously or cyclically adapting the image of the mounting environment of the component to be repaired shown on the display to a real-time repair status of the construction machine, and wherein the controller is configured to gradually cease to display disassembled components in the image of the mounting environment during repair and/or is configured to gradually display newly assembled components in the mounting environment during repair.

18. The method of claim 17, wherein in response to a request from the mobile maintenance station, 3D printing data for printing the replacement part is provided by the first communication link to the mobile maintenance station from the data supply station that is at a separate location, and wherein in response to the mobile maintenance station receiving the 3D printing data, the replacement part is printed layer by layer using the 3D printer at the jobsite of the construction machine, and wherein the 3D printing data is provided to the data supply station by a second communication link from a machine data station that is at a separate location from the mobile maintenance station and the data supply station, wherein the 3D printing data and a plurality of component data for further components of the construction machine or of another construction machine are stored in a storage device at the machine data station, wherein a component data set for a component to be repaired is selected by the data supply station and/or the machine data station from the plurality of component data on the basis of a data set request sent by the mobile maintenance station and is provided to the mobile maintenance station.

19. The method of claim 18, wherein the providing of the 3D printing data to the mobile maintenance station is initiated automatically, depending on a ready-for-replacement signal, and wherein the ready-for-replacement signal is ascertained by a residual service life prediction device, depending on a function of operating data recorded by sensors and/or recorded component characteristics.

20. The method of claim 17, wherein the augmented reality data is provided to the data supply station by a second communication link from a machine data station that is at a separate location from the mobile maintenance station and the data supply station, wherein the augmented reality data and a plurality of component data for further components of the construction machine or of another construction machine are stored in a storage device at the machine data station, wherein the augmented reality data and a plurality of augmented reality data and component data relating to further components of the construction machine or of another construction machine are stored in a storage device at the machine data station, wherein an augmented reality data set for the component to be repaired is selected by the data supply station and/or the machine data station from the plurality of augmented reality and the component data on the basis of a data set request sent by the mobile maintenance station and is provided to the mobile maintenance station.

* * * * *